US007818506B1

(12) United States Patent
Shepstone et al.

(10) Patent No.: US 7,818,506 B1
(45) Date of Patent: Oct. 19, 2010

(54) METHOD AND SYSTEM FOR CACHE MANAGEMENT

(75) Inventors: Lee Shepstone, Oxford (GB); Conleth S. O'Connell, Jr., Austin, TX (US); Mark R. Scheevel, Austin, TX (US); Newton Isaac Rajkumar, Hyderabad (IN); Jamshid Afshar, Jr., Austin, TX (US); Puhong You, Cedar Park, TX (US); Brett J. Larsen, Austin, TX (US); David Dean Caldwell, Dripping Springs, TX (US)

(73) Assignee: Vignette Software LLC, Austin, TX (US)

( * ) Notice: Subject to any disclaimer, the term of this patent is extended or adjusted under 35 U.S.C. 154(b) by 278 days.

(21) Appl. No.: 11/825,909

(22) Filed: Jul. 10, 2007
(Under 37 CFR 1.47)

Related U.S. Application Data

(63) Continuation-in-part of application No. 11/701,193, filed on Feb. 1, 2007, now Pat. No. 7,752,394, which is a continuation of application No. 10/733,798, filed on Dec. 11, 2003, now Pat. No. 7,188,216.

(60) Provisional application No. 60/830,154, filed on Jul. 11, 2006, provisional application No. 60/433,408, filed on Dec. 13, 2002.

(51) Int. Cl.
 *G06F 13/00* (2006.01)
(52) U.S. Cl. ............... 711/133; 711/118; 711/159; 709/217; 709/218; 709/219
(58) Field of Classification Search .................. 711/133
See application file for complete search history.

(56) References Cited

U.S. PATENT DOCUMENTS

| 5,202,982 | A  | 4/1993  | Gramlich et al. |
| 5,473,772 | A  | 12/1995 | Halliwell et al. |
| 5,504,879 | A  | 4/1996  | Eisenberg et al. |
| 5,740,430 | A  | 4/1998  | Rosenberg et al. |
| 5,946,697 | A  | 8/1999  | Shen |
| 6,029,175 | A  | 2/2000  | Chow et al. |
| 6,151,624 | A  | 11/2000 | Teare et al. |
| 6,178,461 | B1 | 1/2001  | Chan et al. |
| 6,192,415 | B1 | 2/2001  | Haverstock et al. |
| 6,198,824 | B1 | 3/2001  | Shambroom |
| 6,272,492 | B1 | 8/2001  | Kay |

(Continued)

OTHER PUBLICATIONS

Chen et al., "Wormhole Caching with HTTP Push Method for Satellite-Based Web Content Multicast and Replication System" Workshop 99, pp. 1-14, 1999.

(Continued)

*Primary Examiner*—Hetul Patel
(74) *Attorney, Agent, or Firm*—Sprinkle IP Law Group

(57) ABSTRACT

Systems and methods for managing cached content are disclosed. More particularly, embodiments of the present invention may allow cached content to be updated (e.g. regenerated or replaced) based on newly added or changed content. Specifically, embodiments of the present invention may allow cached content to be regenerated, replaced or updated based on newly added or changed content associated with the cached content allowing cached content to be updated substantially immediately when pertinent new content is added or content from which the cached content was generated is altered.

20 Claims, 6 Drawing Sheets

U.S. PATENT DOCUMENTS

| | | |
|---|---|---|
| 6,408,360 B1 | 6/2002 | Chamberlain et al. |
| 6,571,246 B1 | 5/2003 | Anderson et al. |
| 6,591,266 B1 | 7/2003 | Li et al. |
| 6,651,217 B1 | 11/2003 | Kennedy et al. |
| 6,697,844 B1 | 2/2004 | Chan et al. |
| 6,701,428 B1 | 3/2004 | Harvey, III et al. |
| 6,754,621 B1 | 6/2004 | Cunningham et al. |
| 6,760,813 B1 * | 7/2004 | Wu ............................ 711/133 |
| 6,772,203 B1 * | 8/2004 | Feiertag et al. ............. 709/219 |
| 6,785,769 B1 | 8/2004 | Jacobs et al. |
| 6,850,941 B1 | 2/2005 | White et al. |
| 7,024,452 B1 | 4/2006 | O'Connell et al. |
| 7,137,009 B1 | 11/2006 | Gordon et al. |
| 7,188,216 B1 | 3/2007 | Rajkumar et al. |
| 7,360,025 B1 | 4/2008 | O'Connell et al. |
| 7,398,304 B2 | 7/2008 | Smith et al. |
| 2001/0032254 A1 | 10/2001 | Hawkins |
| 2001/0034771 A1 | 10/2001 | Hutsch et al. |
| 2001/0037407 A1 | 11/2001 | Dragulev et al. |
| 2002/0065912 A1 | 5/2002 | Catchpole et al. |
| 2002/0165877 A1 | 11/2002 | Malcolm et al. |
| 2002/0178187 A1 | 11/2002 | Rasmussen et al. |
| 2002/0194219 A1 | 12/2002 | Bradley et al. |
| 2003/0078964 A1 | 4/2003 | Parrella et al. |
| 2003/0217117 A1 | 11/2003 | Dan et al. |
| 2004/0030697 A1 | 2/2004 | Cochran et al. |
| 2004/0030746 A1 | 2/2004 | Kavacheri et al. |
| 2004/0205165 A1 | 10/2004 | Melamed et al. |
| 2004/0205452 A1 | 10/2004 | Fitzsimmons et al. |

OTHER PUBLICATIONS

Fielding et al. "13 Caching in HTTP" part of Hypertext Transfer Protocol—HTTP/1.1, The Internet Society, 20 pgs, 1999.

Dias et al., A Smart Internet Caching System' by University of Moratuwa, Sri Lanka, 13 pgs, 1996.

Office Action issued in U.S. Appl. No. 10/733,798, dated May 31, 2006, 14 pgs.

Office Action issued in U.S. Appl. No. 10/733,798, dated Jan. 3, 2006, 9 pgs.

Office Action issued in U.S. Appl. No. 10/733,742, dated Aug. 22, 2007, 14 pgs.

Office Action issued in U.S. Appl. No. 10/733,742, dated Feb. 7, 2007, 12 pgs.

Office Action issued in U.S. Appl. No. 10/733,742, dated Sep. 15, 2006, 8 pgs.

Office Action issued in U.S. Appl. No. 10/733,742, dated Jun. 6, 2006, 15 pgs.

Office Action issued in U.S. Appl. No. 10/733,742, dated Jan. 17, 2006, 10 pgs.

Office Action issued in U.S. Appl. No. 11/701,193, dated Oct. 2, 2008, 9 pgs.

Office Action issued in U.S. Appl. No. 11/701,193 dated Mar. 31, 2009, Rajkumar, 9 pages.

Office Action issued in U.S. Appl. No. 11/701,193, mailed Oct. 22, 2009, 10 pgs.

Office Action issued in U.S. Appl. No. 12/819,985 mailed Aug. 2, 2010, 9 pgs.

* cited by examiner

METHOD AND SYSTEM FOR CACHE MANAGEMENT

RELATED APPLICATIONS

This application claims a benefit of priority to U.S. Provisional Patent Application No. 60/830,154, entitled "System and Methodology Using Query Matching Optimization to Improve Cache Management" by Lee Shepstone, filed Jul. 11, 2006. This application is a continuation in part of U.S. patent application Ser. No. 11/701,193, entitled "Method and System for an Extensible Caching Framework" by N. Isaac Rajkumar, Puhong You, David Dean Caldwell, Brett J. Larsen, Jamshid Afshar and Conleth O'Connell, filed Feb. 1, 2007 now U.S. Pat. No. 7,752,394; which is a continuation of U.S. patent application Ser. No. 10/733,798 (now U.S. Pat. No. 7,188,216), entitled "Method and System for an Extensible Caching Framework" by N. Isaac Rajkumar, Puhong You, David Dean Caldwell, Brett J. Larsen, Jamshid Afshar and Conleth O'Connell, filed Dec. 11, 2003; which claims the benefit of U.S. Provisional Patent Application No. 60/433,408, entitled "Extensible Framework for Caching and Configurable Caching Parameters" by N. Isaac Rajkumar, Conleth O'Connell, Jamshid Afshar, Puhong You, Brett J. Larsen and David Dean Caldwell, filed Dec. 13, 2002. This application is related to U.S. patent application Ser. No. 10/733,742 entitled "Method and System for Automatic Cache Management" by Conleth O'Connell, Mark R. Scheevel and N. Isaac Rajkumar, filed Dec. 11, 2003. All applications cited within this paragraph are fully incorporated herein by reference.

TECHNICAL FIELD OF THE INVENTION

This invention relates in general to methods and systems for managing content, and more particularly, to methods and systems for caching data associated with responses to web site requests.

BACKGROUND OF THE INVENTION

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety of methods by which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support the documents and applications present on the World Wide Web. Documents, known as web pages, may be transferred across the Internet according to the Hypertext Transfer Protocol ("HTTP") while applications may be run by a Java virtual machine present in an internet browser. Web pages are often organized into web sites that represent a site or location on the world wide web. The web pages within a web site can link to one or more web pages, files, or applications at the same web site or at other web sites. A user can access web pages using a browser program and can "click on" links in the web pages being viewed to access other web pages.

Each time the user clicks on a link (or types an address into a browser program), the browser program generates a request and communicates it to a web server hosting web pages or applications associated with the web site. The web server retrieves the requested web page or application from an application server or Java server and returns it to the browser program. Web pages and applications can provide a variety of content, including text, graphics, interactive gaming and audio and video content.

Because web pages and associated applications can display content and receive information from users, web sites have become popular for enabling commercial transactions. As web sites become more important to commerce, businesses are increasingly interested in quickly providing responses to user's requests. One way of accelerating responses to requests on a web site is to cache the web pages or applications delivered to the requesting user in order to allow faster access time to this content when it is next requested.

Current caching methods, however, typically provide very limited functionality. This functionality may be particularly limited when it comes to dealing with changes in content. When an identical request is presented content may be served from the cache, even though this content may have been updated at the application server in the intervening time span; or content responsive to the request must once again be generated and cached, delaying the response to the request.

SUMMARY OF THE INVENTION

Systems and methods for management of caching content are disclosed. More particularly, embodiments of the present invention may allow cached content to be updated (e.g. regenerated or replaced) based on newly added or changed content. Specifically, embodiments of the present invention may allow cached content to be regenerated, replaced or updated based on newly added, or changed, content associated with the cached content such that cached content is updated substantially immediately when pertinent new content is added or when content from which the cached content was generated is altered.

By updating the cached content substantially immediately following an addition or alteration of content at least a two-fold benefit may be achieved in the performance of a caching system or an associated site. Namely, the benefits of caching (e.g. speed) may be realized in addition to the benefits of serving substantially current content from the cache. In other words, current content may be kept and served from the cached without the need to regenerate the content in the cache based on user requests.

Embodiments of these systems and methods may facilitate the updating of cached content by associating metadata with cached content. In particular, this metadata may include a set of rule sensitivities associated with the generation of the cached content. These rule sensitivities, in turn, may allow a cache manager to dynamically update this cached content based upon conditions other than a request for similar content, including the addition of new content associated with the cached content or alterations or updates to content used to generate the cached content.

In one embodiment, a notification regarding newly added content may be received at a cache manger. The cache manger may use this notification to identify content previously stored in the cache which is pertinent to the newly added content. A variety of actions may then be taken with respect to the identified content. For example, in one embodiment new content may be generated and the identified content may be replaced with this newly generated content. Alternatively, the identified content may be flushed from the cache or marked as stale.

Similarly, in one embodiment, a notification regarding altered content may be received at a cache manger. This notification may comprise, for example, a unique identifier corresponding to the altered content. The cache manger may use this unique identifier to identify content previously stored in the cache which was generated based on the altered version (e.g. the same content before it was altered). Actions may then be taken with respect to this identified content.

Embodiments of the present invention can be implemented in a computer communicatively coupled to a network (e.g., the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (e.g., mouse, trackball, stylist, etc.), or the like. In embodiments of the invention, the computer has access to at least one database over the network.

ROM, RAM, and HD are computer memories for storing computer-executable instructions executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (e.g., a HD). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of complied C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
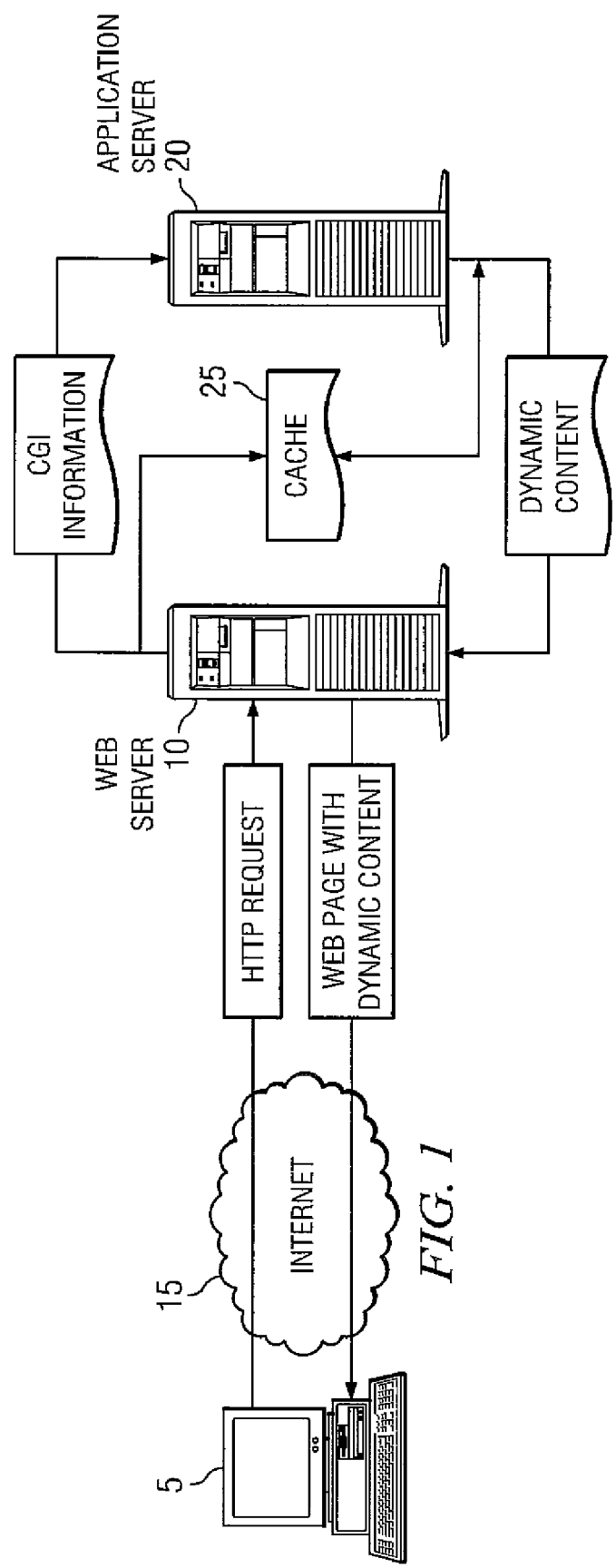
FIG. 1 is a diagrammatic representation of one embodiment of a system of caching content at a web site.

Before discussing embodiments of the present invention, an exemplary hardware architecture for use in conjunction with embodiments of the present invention is described. While the it may useful to an understanding of embodiments of the present invention to describe embodiments of the present invention in conjunction with such an exemplary architecture it will be understood that embodiments of the present invention may also be implemented in conjunction with a wide variety of other architectures. In FIG. 1, a user on client computer 5, through an Internet browser, makes a request (using HTTP for example) for content to a web server 10 over the Internet 15 (or other network). Content may be an application or data provided by a web site such as an HTML page, Java application or the like.

For example, if the requested web page includes dynamic content, the web server 10 may initiate a script, using, for example, the common gateway interface ("CGI") mechanism, to send data (e.g. a request or portions thereof) to an application server 20 to generate the dynamic content. Application server 20 can generate dynamic HTML (or other types of) content according to a programming language such as Java, C or PERL and return the contents to web server 10. Web server 10 can, in turn, communicate the content back to the client computer 5 as the requested web page.

Figure 2:
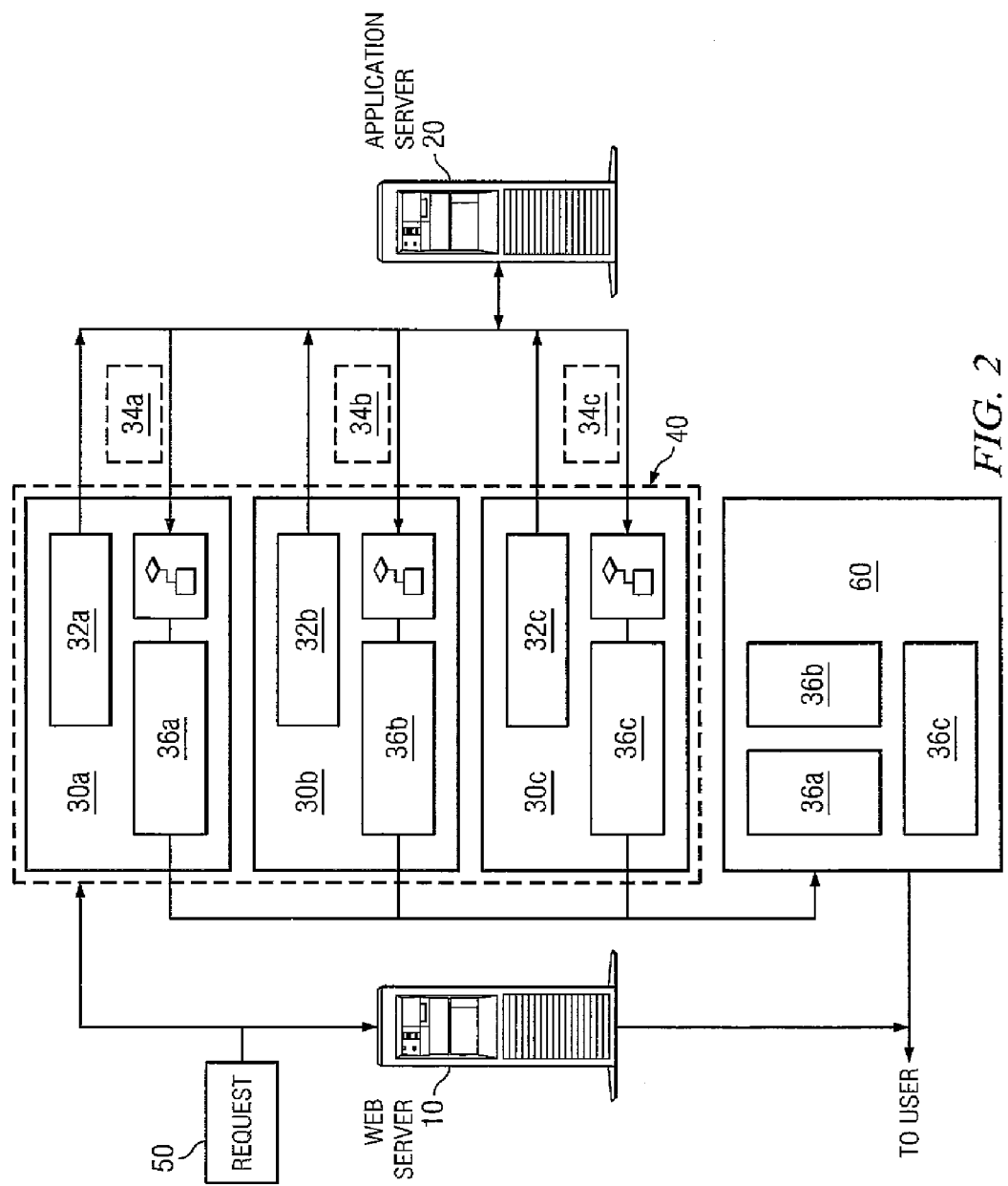
FIG. 2 is a diagrammatic representation of one embodiment of assembling content.

In some cases, content may be assembled from other content chosen based on a request initiated by a user of a site. This may be better explained with reference to FIG. 2 which depicts one example of the assembly of content responsive to a request. Based on an incoming request 50 a content template 40 corresponding to a page or other content may be obtained (e.g. located in memory or storage by web server 10 or application server 20 using at least a portion of the request 50).

This template 40 may be associated with one or more components 30, where each of these components 30 is operable to generate content to be included in assembled content according to the template 40 and responsive to request 50. Each of these components 30, in turn, may be associated with one or more rules 32. Each of these rules 32 may be used to obtain or identify content 34 (e.g. from application server 20 or another source such as a data store associated with application server 20) based on a set of sensitivities, for example a format of content (e.g. articles, graphics, etc.), type of content (news, etc.), a category of content (e.g. sports, entertainment, etc.) timing of content (e.g. most recent, within the last day, hour, week, etc.), etc. The content 34 obtained utilizing rules 32 associated with a particular component 30 may then be processed by that component 30 to generate content 36 for that component 30 (for example, formatting the content, extracting portions of the content, generating HTML, WML or XML based on the content, etc.), and the content 36 generated for each of those components 30 assembled to formulate content 60 responsive to the request 50 which may then be sent to the user who initiated the request 50 (it will be understood that content responsive to the request may include other or additional content to that generated by components 30).

Returning to FIG. 1, before or during the assembly of content responsive to a request, web server 10 may check to see if content associated with the request (e.g. content which was generated by a component and used to assemble a response to the request) is stored in cache 25, and if so, web server 10 can communicate this content back to the user on client computer 5 (e.g. use the cached content to assemble a response to the request), otherwise web server may pass on the request or portions thereof to application server 20 as described above such that the appropriate content may be generated. For example, referring briefly again to FIG. 2, template 40 is being used to assemble content responsive to request 50. In this case, web sever 10 may check cache 25 to determine if content 36a, 36b, 36c generated by component 30a, 30b or 30c is present in cache 25. If content 36a, 36b or 36c is present in cache 25 this cached content 36a, 36b or 36c may be used to assemble content 60 in response to the request, while if content corresponding to a component is not present the corresponding component 30a, 30b, 30c may be used to generate the content. By caching content delivered from application server 20, this cached content may subsequently be used to assemble content in response to a request such that the responsive content (e.g. content assembled in response to a request) may be delivered to client computer 5.

Caching content in cache 25 may, however, be somewhat problematic. More particularly, content may be added (e.g. to a data store associated with application server 20), where this content may be pertinent, or otherwise related, to content in cache 25. For example, suppose content responsive to a user request includes content generated by a component operable to generate content comprising headlines corresponding to the five most recent news articles (e.g. in a data store). Suppose further that in response to the user request this content is generated by the component using the five most recent news articles and stored in cache 25.

Now suppose that a news article is added (e.g. to the data store). Here, the content stored in cache 25 has been rendered stale by virtue of the newly added article. In other words, if the component which originally generated the content were now invoked the content generated would be different than the cached content (e.g. it would include the headline from the newly added news article). Thus, any subsequent responses to user requests which utilize the previously cached content (e.g. requests which reference a template associated with the component which generated the cached content) may comprise the stale cached content until such a point as the cached content is flushed or regenerated.

Similarly, cached content within cache 25 may also be rendered stale through changes to content already present when the cached content was generated. Continuing with the above example, suppose content responsive to a user request includes content generated by a component operable to generate content comprising headlines corresponding to the five most recent news articles (e.g. in a data store). Suppose further that in response to the user request this content is generated by the component using the five most recent news articles and stored in cache 25. Now suppose that the headline of one of the five most recent news article is altered. Here, the content stored in cache 25 has been rendered stale by virtue of the altered article. Again, if the component which originally generated the content were now invoked the content generated would be different than the previously cached content (e.g. it would include the headline corresponding to the altered news article).

As can be seen from the above examples, there may be a period of time where stale content may be served to a user from the cache. As it is desired to communicate current information or content to users, it may be desirable to substantially minimize or otherwise reduce this time period.

To that end among others, attention is now directed to systems and methods for managing cached content. More particularly, embodiments of the present invention may allow cached content to be updated (e.g. regenerated or replaced) based on newly added or changed content. Specifically, embodiments of the present invention may allow cached content to be regenerated, replaced or updated based on newly added, or changed, content associated with the cached content such that cached content is updated substantially immediately when pertinent new content is added or content from which the cached content was generated is altered. By updating the cached content substantially immediately following an addition or alteration of content at least a twofold benefit may be achieved in the performance of a caching system or an associated site. Namely, the benefits of caching (e.g. speed) may be realized in addition to the benefits of serving substantially current content from the cache.

Embodiments of these systems and methods may facilitate the updating of cached content by associating metadata with cached content. In particular, this metadata may include a set of rule sensitivities associated with the generation of the cached content. These rule sensitivities, in turn, may allow a cache manager to dynamically update this cached content based upon conditions other than a request for similar content, including the addition of new content associated with the cached content or alterations or updates to content used to generate the cached content. In particular, these rule sensitivities may be used to locate or otherwise identify cached content pertinent to newly added content such that the cached content may be updated.

Furthermore, in some embodiments, the updating of located or identified cached content may be accomplished using the metadata stored in association with the cached content where the metadata includes metadata associated with the generation of the cached content. Embodiments of these systems and methods may facilitate the storing of metadata associated with cached content by using a generalized extensible architecture that allows evaluation of the parameters associated with the generation of the cached content such as sensitivities associated with a component or a wide variety of other parameters including those associated with cookies, form data, session data, request, browser capabilities, etc.

This metadata may comprise almost any data obtained in conjunction with the generation of the cached content, including rule sensitivities or content identifiers as discussed above. Additionally, the metadata may include request metadata obtained in conjunction with the request itself. This request metadata may pertain to the assembly of content which interests the user, and may consist of data pertaining to the individual aspects and parameters of the request, including parameters associated with a template which may be used to generate content responsive to the request. For example, the request may contain a Universal Resource Locator (URL), originating locale, a query string, or perhaps a user-agent string indicating the type of browser initiating the request. This metadata may be used by a cache manger to regenerate an original request in order to refresh the content residing in cache.

Metadata may also be obtained from the template used to assemble content responsive to a request. This template metadata may contain information on aspects of a request to which a particular piece of content may be sensitive, and whether a particular piece of content should be cached.

In one embodiment, a cache manager may be registered with an application manager which informs the cache manager when content has been updated or new content has been added. Based upon this notification and metadata associated with the cached content, the cache manager may identify cached content pertaining to the new or updated content. Using the metadata stored in association with the identified cached content a cache manager may regenerate a request associated with the cached content such that the cached content may be updated. Updating the cache may be done in the background without receiving a new request from a user, allowing content in the cache to be kept current and drastically improving the performance and response time of a web site.

This application manager may, in turn, be part of or in communication with a content deployment agent coupled to a content management system. The deployment agent may receive updated content, and the application manager may take notice when content has been updated or added in conjunction with the deployment agent. The application manager may also be responsible for the assembly of content to be delivered by an application server in response to a request from a user.

An extensible caching framework may be present on web server 10 to evaluate incoming requests or locate cached content responsive to the incoming request based on the parameters contained in the request. In particular, this extensible caching framework may provide one or more component sensitivities to be stored in conjunction with cached content such that cached content pertaining to newly added or altered content may be identified. This extensible caching framework may also formulate a signature to be utilized in retrieving this content from cache 25 when a request for the same content is received by web server 10 and provides metadata to be stored in conjunction with the content in order to facilitate regeneration of the request which originally resulted in delivery or generation of the cached content.

Figure 3:
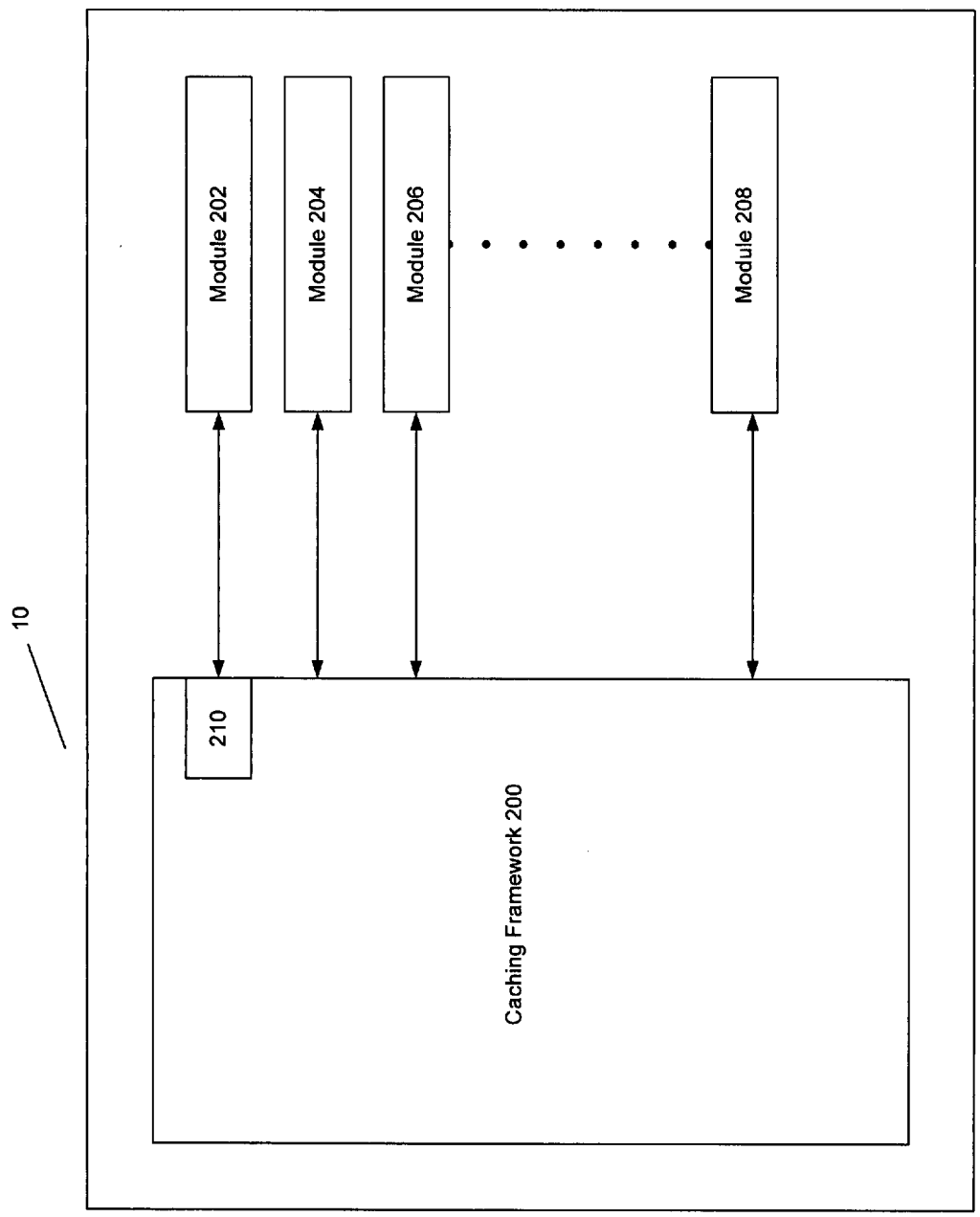
FIG. 3 is a diagrammatic representation of one embodiment of a system for an extensible caching framework.

Moving now to FIG. 3, an architectural diagram of an embodiment of an extensible caching framework is depicted. Extensible caching framework 200 may reside on web server 10 and use modules 202, 204, 206, 208 to evaluate parameters of an incoming request. Each of these modules 202, 204, 206, 208 may be responsible for a particular parameter associated with an incoming request. In many embodiments, the operators of a website can dictate specific parameters of an incoming request they wish to be evaluated by registering a custom module 208 with the framework. In this manner, the architecture 200 is made extensible by allowing the operators to add and remove modules 202, 204, 206, 208 relating to a wide variety of parameters of incoming requests.

When a module 202, 204, 206, 208 is registered with the framework, the module 202, 204, 206, 208 may initialize and pass to the framework a set of configuration variables, these configuration variables may include interface method 210 to be used between the framework and module 202. More specifically, this may include variables of an incoming request to be passed by framework 200 to module 202, the template metadata of the content requested and desired by module 202, and the format in which information is to be returned by module 202 to framework 200. This registration data may also include registering configuration variables used by the module 202, and specific routines used by the module 202 for request mapping. During operation of framework 200, when web server 10 receives a request, modules 202, 204, 206, 208 executing on web server 10 may each evaluate portions of the incoming request with respect to the parameter to which the module 202, 204, 206, 208 pertains and pass their respective evaluations to framework 200. These evaluations may include metadata regarding a parameter of a request, whether module 202, 204, 206, 208 believes the request should be served from cache 25 or passed along to application server 20, or a string value which may be used for locating responsive content in cache 25, for caching any content generated from application server 20 based on the request, or for assembling a signature to be associated with any content generated from application server 20.

Examples of caching parameters that may be evaluated by these modules include query string variables in the request, cookies in the request, the HTTP header in the request, form variables in the HTTP POST request, locale detected from the request, or a custom defined parameter. It will be readily apparent to those of ordinary skill in the art that a wide variety of parameters may be identified in requests and utilized in the caching of various pieces of content. Additionally, it will be apparent that because of the variety of these parameters the implementation of each module 202, 204, 206, 208 may vary greatly, and that the important concept is that modules may be added and removed from framework 200, and framework 200 will continue to utilize a set of available modules 202, 204, 206, 208 in the evaluation of incoming requests and the caching of the corresponding generated content.

The evaluation of these individual parameters allows content delivered in response to a request to be tailored more accurately to the specifics of an incoming request. For example, in some cases there may be many versions of a particular piece of content, one that employs Java, one that employs frames, and one that employs Active X. If content employing Java is delivered to a browser which utilizes Active X the content may be incorrectly displayed.

Figure 4:
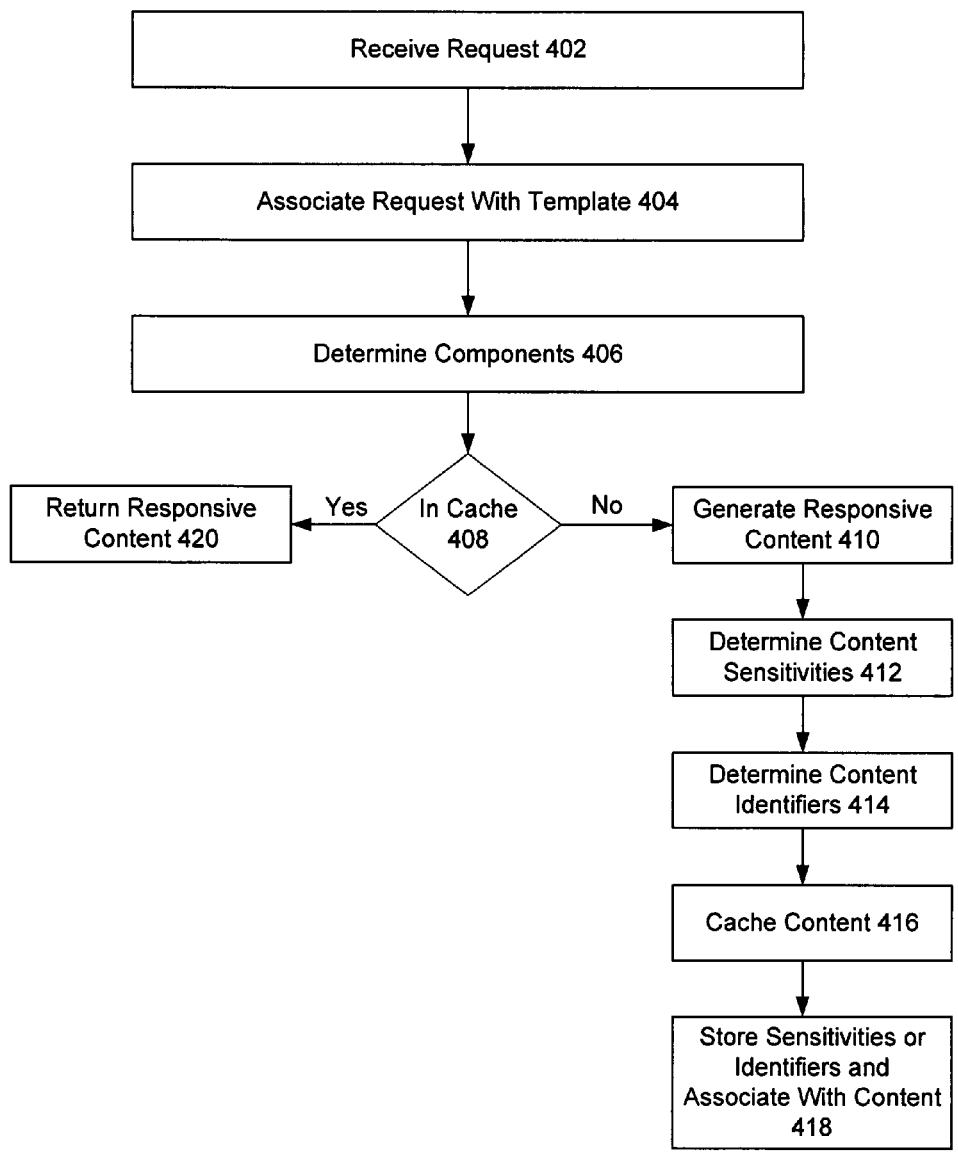
FIGS. 4 and 5 are flow diagrams for one embodiment of a method for cache management.

The data generated by modules 202, 204, 206, 208 may, in turn, be utilized in conjunction with cached content to regenerate cached content based upon added or altered content pertinent to the cache content. This ability may be explained in more detail with reference to FIGS. 4 and 5 which depicts an embodiment of the method for utilization of the extensible caching framework and its corresponding modules in conjunction with updating a cache during the operation of a web site. At step 402 a request may be received and this request associated with a template at step 404. Once a template is associated with the request at step 404 a set of components associated with the template may be determined at step 406, and for each of the components the cache may be checked to see if content responsive to the request is located in the cache at step 408.

If responsive content is found it may be returned, (e.g. used to assemble content responsive to the request) at step 420. If, however, responsive content for a component is not located in the cache the method may further comprise generating responsive content using the component at step 410 and determining rule sensitivities or content identifiers at steps 412 and 414, respectively. This generated content may then be cached at step 416 and the rule sensitivities or content identifiers stored in such a manner that they are associated with the cached content to which they correspond at step 418.

Figure 5:
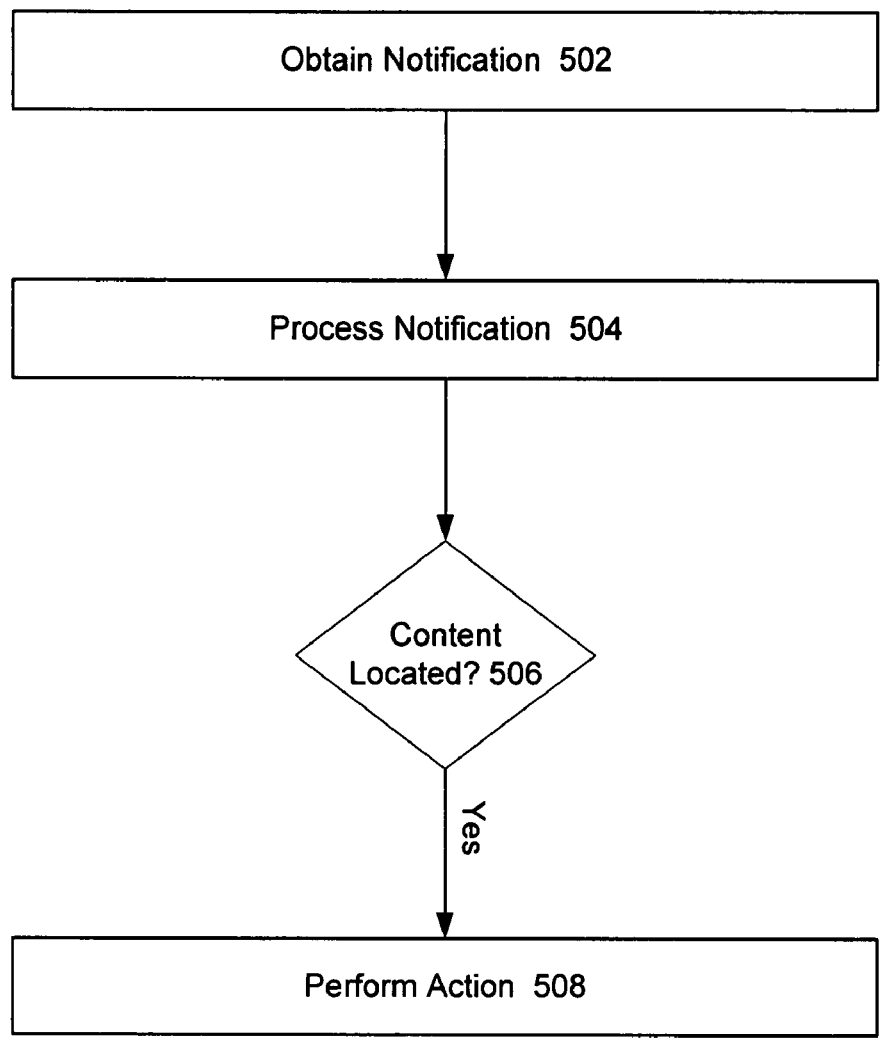

Turning now to FIG. 5, at some later point notification that content has been added or updated may be obtained (e.g. received, retrieved, fetched, etc.) at step 502. In one embodiment, this notification may comprise a generated event which comprises values associated with a set of criteria corresponding to the newly added or updated content (such as type, category, content identifier etc.). Once this notification is obtained, this notification may be processed at step 504, where the processing of the notification comprises, at step 506, locating cached content associated with the notification (e.g. pertinent to the newly added or changed content to which the notification corresponds) if it exists. Cached content may be located, in one embodiment, by comparing the values for criteria in the notification with the metadata stored in association with content in the cache (e.g. rule sensitivities or content identifiers). If any cached content is found which corresponds to the notification an action may be taken with respect to this cached content at step 508.

In one embodiment, this action may flush the located cached content such that the next time a request for the same or similar content is received new content will be generated and stored in the cache. Alternatively, the request which resulted in that cached content may be regenerated (e.g. using metadata associated with the cached content) such that the component which generated the cached content may be invoked to generate new content, and this newly generated content used to replace the located cached content. It will be apparent after reading the above that other embodiments of the present invention may take almost any variety of actions with respect to the located cached content, and that these actions are within the scope of the present invention.

Note, as well, that not all of the activities described in the process flow diagrams are required, that an element within a specific activity may not be required, and that further activities may be performed in addition to those illustrated. Additionally, the order in which each of the activities are listed is not necessarily the order in which they are performed. After reading this specification, a person of ordinary skill in the art will be capable of determining which activities and orderings best suit any particular objective of an embodiment of the present invention.

Figure 6:
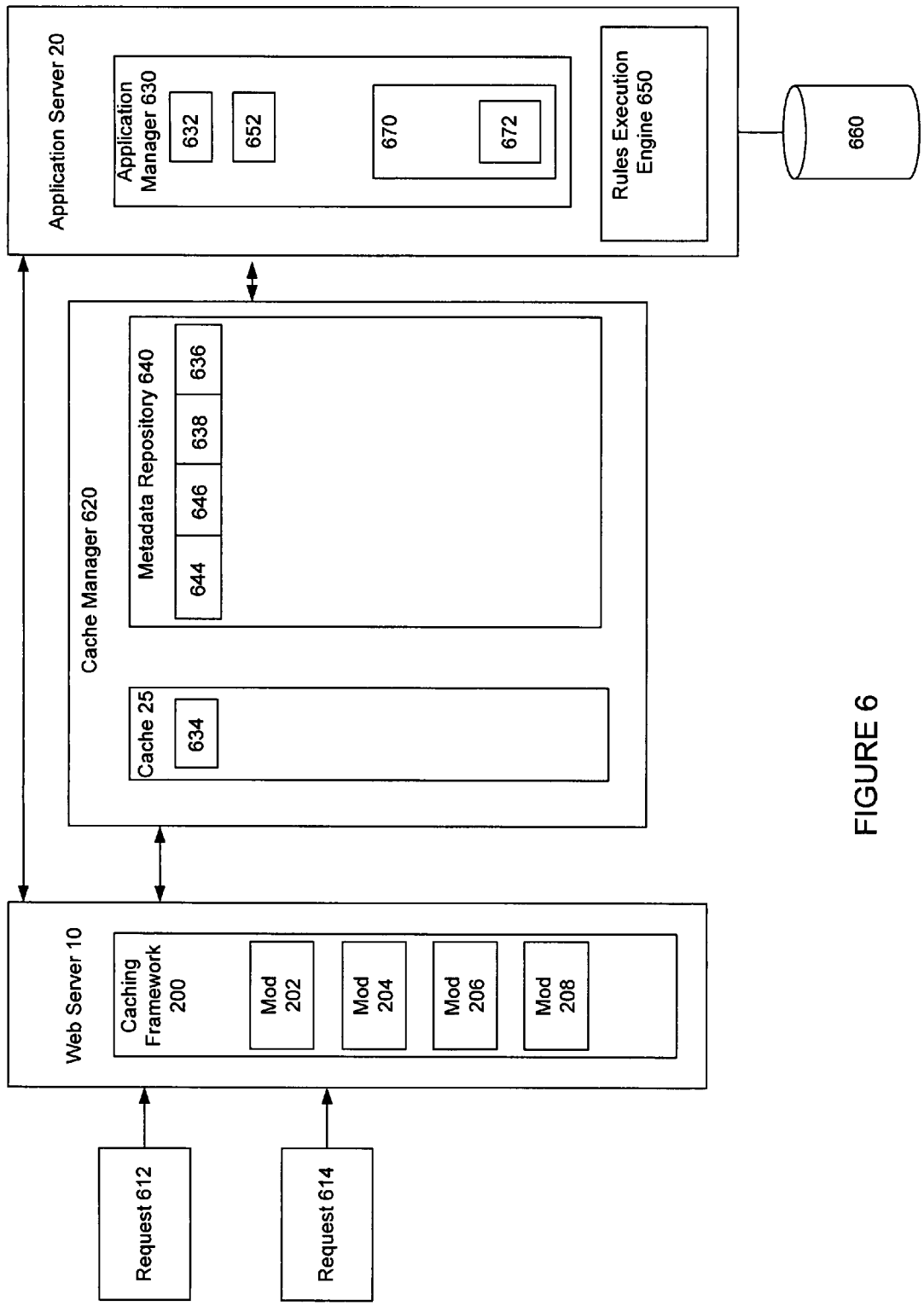
FIG. 6 is a diagrammatic representation depicting one embodiment of a system for automatic cache management.

Moving now to FIG. 6, one embodiment of an architecture for the management and automatic update of a cache in accordance with the present invention is depicted. More specifically, in the embodiment depicted, cache 25 may be managed using cache manager 620 in communication with application manager 630 associated with application server 20. Cache manager 620 may be responsible for managing cache 25 (which may be a physical or logical cache) and may substantially automate the functionality of cached file placement, expiration and request regeneration.

To illustrate more clearly with respect to the embodiment depicted, when an incoming request 612 is received by web server 10 request 612 is evaluated by caching framework 200 and its associated modules 202, 204, 206, 208 as described above. To elaborate in more detail, when a request comes in from a client computer this request usually contains a URL which references content which resides on application server 20. This piece of content may be assembled utilizing various associated components and returned to a client computer based upon specifics contained in the request. Consequently, a template may be formed which contains metadata regarding aspects of a request which may pertain to assembling the specifics and subparts of a particular piece of content, as discussed above. Thus, templates corresponding to content (which includes an application server such as a JSP (Java Service Pages), etc.), which are part of a web site may be registered with the extensible caching framework where a template comprises metadata pertinent to content to be generated utilizing, or in conjunction with, that template.

Thus, after a request 612 is received by web server 10 this request may be associated with a template by extensible caching framework 200 residing on web server 10. For example, a request issued from a client computer usually contains a URL which may refer to a specific piece of content residing on application server 20, along with associated data pertaining to how a user on the client computer would like the requested content assembled. Consequently, extensible caching framework 200 can identify content that is to be assembled in accordance with this request by comparing the URL of an incoming request with registered templates associated with application server 20. Framework 200 may then associate the template corresponding to the requested content with the incoming request This identified template, in turn, may correspond to a set of components, as described above. Extensible caching framework 200 may parse or otherwise obtain information relating to the components associated with the template corresponding to the incoming request and pass this information, along with associated template metadata or other data associated with request or template, to modules 202, 204, 206, 208.

In turn, each module 202, 204, 206, 208, 210, 212 may evaluate the parameters or metadata to which it pertains. Modules 202, 204, 206, 208 invoked for this evaluation process may return several pieces of data to caching framework 200. Data which may be returned by a module 202, 204, 206, 208 may be request or template metadata which is to be stored in conjunction with cached content in order to facilitate regeneration of the request which resulted in an associated piece of cached content.

It may also be determined if requested content associated with one or more of the components of the identified template is in cache 25. If requested content associated with a component corresponding to the template is not contained in cache 25 the request 612 (or portions thereof) is passed on to application server 20, where responsive content will be generated by the components associated with the template.

When a component is invoked to generate content in response to the request 612, a set of rule sensitivities and a set of content identifiers may be also be generated based on the content used to generate content responsive to the request. This generated content along with the corresponding set of rule sensitivities and content identifiers may then be passed to cache manager 620 or web server 10.

More specifically, when request 612 is passed to application server 20, component 670 may be selected by application server 20 to generate content responsive to the request 612. This component 670 may comprise a rule 672 which is configured to select content from data store 660 based on values for a set of criteria (e.g. type of the content, category of content, time of creation, author, etc.). For example a rule may select content where the Type=News in chronological order, with a maximum number of 10 or content, where the Type=News in chronological order, with a maximum number of 5, etc. The values and corresponding criteria associated with a particular rule are known as the rule sensitivities for that rule. In other words, for a rule which selects content where the Type=News in chronological order, with a maximum number of 10 the rule sensitivities for that rule may be Type=News (or just News), or the rule sensitivities may be Type=News, Order=Time, Number=10, for a rule which selects content where Type=News AND Category=Sports AND Sport=Basketball in chronological order, with a maximum Publish date of 3 days ago the rule sensitivities may be Type=News, Cat=Sports, Sport=Basketball and PubDate=Today-3, etc. Thus, rules sensitivities may be any set or subset of the values or criteria corresponding to a rule where the criteria may comprise almost any property which may be associated with selection of content including category, navigational aspects, time periods or other properties or attributes.

Rule 672 may be executed or otherwise implemented by rule execution engine 680 resulting in the selection of content from data sore 660. Once rule 672 has been used to select content from data store 660, the selected content may be further processed by component 670 to generate content 632 corresponding to the request. This generated content 632 may then be sent to web server 10 to assemble into content responsive to request 612. Additionally, generated content 632 may be sent to cache manager 620 from application server 20 along with the rule sensitivities 644 corresponding to rule 672 of component 670 used to generate the content 632. Furthermore, the content selected by execution of rule 672 may correspond to a set of content identifiers, where a unique content identifier may be associated with each piece of content stored in data store 660. These content identifiers 646 corresponding to content selected by rule 672 in conjunction with the generation of content 632 may also be sent to cache manager 620 in conjunction with content 632 and rule sensitivities 644.

Thus, when the generated content 632 is subsequently stored in cache 25, the cached content 634 (e.g. corresponding to the generated content 632) may be associated with a corresponding set of rule sensitivities 644 and content identifiers 646. Additionally, cached content 634 may be associated with metadata 638 pertaining to the template corresponding to cached content 634, or metadata 436 corresponding to the original request 612 (as discussed above). In one embodiment, cache manager 620 comprises metadata repository 640, where each entry in metadata repository 640 corresponds with an entry in cache 25. Thus, data associated with an entry in cache 25 such as content sensitivities, content identifiers, template metadata, request metadata, etc. may be stored in conjunction with an entry of metadata repository 640 and associated with a corresponding entry in cache 25 (for example, an entry in cache 25 and a corresponding entry in metadata repository 640 may be accessed using an identical signature, hash value, etc.) Thus, data associated with an entry in cache 25 may be passed from caching framework 200 or application server 20 to cache manager 620 for storage in conjunction with content generated in response to a request. Here, entry in cache 25 comprising content 634 corresponds to an entry in metadata repository 640 comprising rule sensitivities 644, content identifiers 646, metadata 638 pertaining to a template and metadata 436 corresponding to the original request 612.

At some point subsequent, content may be added to application server 20 (e.g. data store 660 associated with application server 20). This new content may be pertinent to content in cache 25, as discussed above. Thus, it may be desirable to update cache 25 with content generated based upon the content newly added to application server 20 in order that the most up to date content may be served from cache 25 in response to another request similar to request 612. Embodiments of the present invention allow content 634 in cache 25 to be updated with current content without receiving a new request for this content. This may be accomplished by replacing previously cached content 634 with new content generated by a component (e.g. component 670) of application manager 20 in response to a regenerated request, where the regenerated request was initiated based upon added content.

More specifically, in one embodiment, cache manager 620 may be informed that content has been added (e.g. to data store 660, or another data store or location associated with application manager 20 or web server 10). In one particular embodiment this is done through an event. When an application or content (collectively referred to as content, herein) is added in conjunction with application server 20 this content is registered with application manager 630. In turn, application manager 630 may assemble values for a set of criteria associated with the newly added content. This set of criteria may comprise properties or metadata corresponding to the newly added content (e.g. type of the content, category of content, time of creation, author, etc.)

Application manager 630 may propagate the values for the set of criteria associated with the newly added content to cache manager 620 through a communication with the cache manager 620 (e.g. an event). Communication between application manager 630 and cache manager 620 may be accomplished, for example, through the use of Java Messaging Service (JMS), Hyper Text Transfer Protocol (HTTP), Service Oriented Architecture Protocol (SOAP) or eXtensible Markup Language (XML).

When cache manager 620 receives an event, the values for the criteria associated with the event may be utilized to search cache 25 to locate any content pertinent to the event (and thus pertinent to the newly added content corresponding to the event). In one embodiments, cache manager 620 may identify content in cache 25 pertinent to the event by comparing the values for the criteria associated with the event to rules sensitivities in the metadata repository 640 associated with the entries in cache 25. More specifically, for each of the values for the criteria of the event a query may be formed using the value for that criterion such that metadata repository 640 may be queried according to the value for that criterion (e.g. entries in metadata repository 640 may be obtained where the rules sensitivities in metadata repository 640 comprises a value corresponding to the value of the query). Additionally, queries which utilize values for multiple criteria associated with the event may also be used to query metadata repository 640. In one embodiment, cache manager 620 will recursively expand the content into all known rules sensitivities that would match this content had the rule sensitivities been executed as part of a query, performing a "what if" analysis. Thus, by locating entries in metadata repository 640 responsive to these queries, the associated entries in cache 25 which are pertinent to the newly added content may be identified.

As may be imagined values for a whole host of criteria may be associated with newly added content or stored in metadata repository 640 in conjunction with cached content. Thus, it may be desirable to perform the query (e.g. between values for the incoming event and values for rules sensitivities stored in association with cached content) efficiently. To improve efficiency of this query process, therefore, in one embodiment one or more queries may be recursively generated (and possibly concatenated) for each combination of values for the criteria of the event. This query generation may generate a query for a value for one of the criteria where values for all the other criteria are NULL (e.g. the query is performed without respect to the other criteria), and then additionally recursively building a query which adds values corresponding to each of the criteria with an AND operation. Depending on the number and type of criteria, the generation of queries corresponding with an event may result in a single query with grouped sub queries joined by OR functions, or it may generate multiple queries or it may optimize queries using database functions or an IN clause where supported.

It will be noted from a close review of the above description that similar techniques may be utilized in order to update or otherwise manage a cache based upon altered content. For example, content in data store 660 may be altered, where this altered content is pertinent to content in cache 25, as discussed above. Thus, it may be desirable to update cache 25 with content generated based upon this altered content. In this case a notification from application manager 630 to cache 630 may contain the content identifier of the content which was altered. This content identifier may be used to identify content in cache 25 pertinent to the altered content (e.g. generated based upon the content before the alterations took place) by comparing the content identifier of the notification with the content identifiers stored in metadata repository 640 which correspond to entries in cache 25.

After content in cache pertinent to the notification (e.g. cache entries pertinent to newly added or altered content), action may then be taken with respect to the identified cache entries. For example, the identified cache entries may then be flushed from cache 25. Alternatively, once cache manager 620 has identified cached content (e.g. content 634) that is pertinent to newly added or altered content, cache manager 620 may update this content in cache 25. This may be done by regenerating the request that resulted in content 632 being placed in cache 25.

In one embodiment, using request metadata 636, template metadata 638 or any other data in metadata repository 640 associated with the identified cached content, cache manager 620 can regenerate the request which caused application server 620 to generate cached content. Cache manager 620 may regenerate this request and pass it to application manager 20. Application manager 20, in turn, may utilize the request to invoke the component 670 which originally generated cached content 634 to generate content 652 (which may be generated using the newly added content) responsive to this regenerated request and return this newly generated content 652 to cache manager 620. Cache manager 620 can then replace the original content 632 with newly generated content 652 responsive to the regenerated request. In this manner, content in the cache 25 may be kept substantially current with content on application server 20.

Using these various cache management techniques content can be kept up to date in cache 25 without receiving a new request. Consequently, the next time similar a request 614 is received, content 652 responsive to this request 614 may be served from cache 25 as opposed to application server 20 generating responsive content 652 in response to the request. Serving responsive content 652 from cache 25 allows a web site to more quickly respond to an incoming request and reduces the strain on application server 20.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for updating cached content, comprising:
at a cache manager coupled to a web server having access to cached content in a cache managed by the cache manager:
receiving a notification from an application server that new content is added or existing content from which the cached content was generated is altered, wherein the cached content is associated with metadata, wherein the metadata includes a set of rule sensitivities associated with generation of the cached content, and wherein the web server and the application server are coupled to a network;
locating or identifying all the cached content in the cache that is pertinent to the new content or the altered content utilizing the set of rule sensitivities; and
dynamically updating the located or identified cached content using the metadata associated with the located or identified cached content, wherein the updating is performed by the cache manager substantially immediately following an addition of the new content or alteration of the existing content as notified by the application server.

2. The method of claim 1, wherein dynamically updating the located or identified cached content is performed by the cache manager independent of the web server receiving a request from a client computer coupled to the web server over a second network.

3. The method of claim 1, wherein dynamically updating the located or identified cached content further comprises flushing the located or identified cached content from the cache.

4. The method of claim 1, wherein dynamically updating the located or identified cached content further comprises regenerating a request that resulted in the cached content being placed in the cache.

5. The method of claim 4, wherein regenerating the request that resulted in the cached content being placed in the cache further comprises using the metadata stored in association with the cached content to regenerate the request.

6. The method of claim 1, further comprising processing the notification, wherein the notification comprises a generated event, wherein the generated event comprises values associated with a set of criteria, and wherein the set of criteria corresponds to the new content or the altered content.

7. The method of claim 6, wherein locating or identifying all the cached content that is pertinent to the new content or the altered content further comprises comparing the values in the notification with the metadata stored in association with the cached content in the cache.

8. A system for updating cached content, comprising:
a cache storing cached content;
at least one processor;

at least one non-transitory computer readable medium storing instructions translatable by the at least one processor to implement a cache manager for managing the cache, wherein the cache manager is coupled to a web server and an application server, and wherein the cache manager is operable to perform:

receiving a notification from the application server that new content is added or existing content from which the cached content was generated is altered, wherein the cached content is associated with metadata, wherein the metadata includes a set of rule sensitivities associated with generation of the cached content, and wherein the web server and the application server are coupled to a network;

locating or identifying all the cached content in the cache that is pertinent to the new content or the altered content utilizing the set of rule sensitivities; and dynamically updating the located or identified cached content using the metadata associated with the located or identified cached content, wherein the updating is performed by the cache manager substantially immediately following an addition of the new content or alteration of the existing content as notified by the application server.

9. The system of claim 8, wherein dynamically updating the located or identified cached content is performed by the cache manager independent of the web server receiving a request from a client computer coupled to the web server over a second network.

10. The system of claim 8, wherein dynamically updating the located or identified cached content further comprises flushing the located or identified cached content from the cache.

11. The system of claim 8, wherein dynamically updating the located or identified cached content further comprises regenerating a request that resulted in the cached content being placed in the cache.

12. The system of claim 11, wherein regenerating the request that resulted in the cached content being placed in the cache further comprises using the metadata stored in association with the cached content to regenerate the request.

13. The system of claim 8, wherein the instructions are further translatable by the at least one processor to perform processing the notification, wherein the notification comprises a generated event, wherein the generated event comprises values associated with a set of criteria, and wherein the set of criteria corresponds to the new content or the altered content.

14. The method of claim 13, wherein the instructions are further translatable by the at least one processor to perform comparing the values in the notification with the metadata stored in association with the cached content in the cache to locate or identify all the cached content in the cache that is pertinent to the new content or the altered content.

15. A computer program product comprising at least one non-transitory computer readable medium storing instructions translatable by at least one processor to implement a cache manager for managing a cache, wherein the cache manager is coupled to a web server and an application server, wherein the web server has access to cached content in the cache managed by the cache manager, and wherein the cache manager is operable to perform:

receiving a notification from the application server that new content is added or existing content from which the cached content was generated is altered, wherein the cached content is associated with metadata, wherein the metadata includes a set of rule sensitivities associated with generation of the cached content, and wherein the web server and the application server are coupled to a network;

locating or identifying all the cached content in the cache that is pertinent to the new content or the altered content utilizing the set of rule sensitivities; and dynamically updating the located or identified cached content using the metadata associated with the located or identified cached content, wherein the updating is performed by the cache manager substantially immediately following an addition of the new content or alteration of the existing content as notified by the application server.

16. The computer program product of claim 15, wherein dynamically updating the located or identified cached content is performed by the cache manager independent of the web server receiving a request from a client computer coupled to the web server over a second network.

17. The computer program product of claim 15, wherein dynamically updating the located or identified cached content further comprises flushing the located or identified cached content from the cache.

18. The computer program product of claim 15, wherein dynamically updating the located or identified cached content further comprises regenerating a request that resulted in the cached content being placed in the cache.

19. The computer program product of claim 15, wherein the instructions are further translatable by the at least one processor to perform processing the notification, wherein the notification comprises a generated event, wherein the generated event comprises values associated with a set of criteria, and wherein the set of criteria corresponds to the new content or the altered content.

20. The computer program product of claim 19, wherein the instructions are further translatable by the at least one processor to perform comparing the values in the notification with the metadata stored in association with the cached content in the cache to locate or identify all the cached content in the cache that is pertinent to the new content or the altered content.

* * * * *